3,388,371
SONIC ECHO SYSTEM
William B. McLean, China Lake, Calif., assignor to
Walter G. Finch, Baltimore, Md.
Filed May 13, 1966, Ser. No. 549,987
2 Claims. (Cl. 340—3)

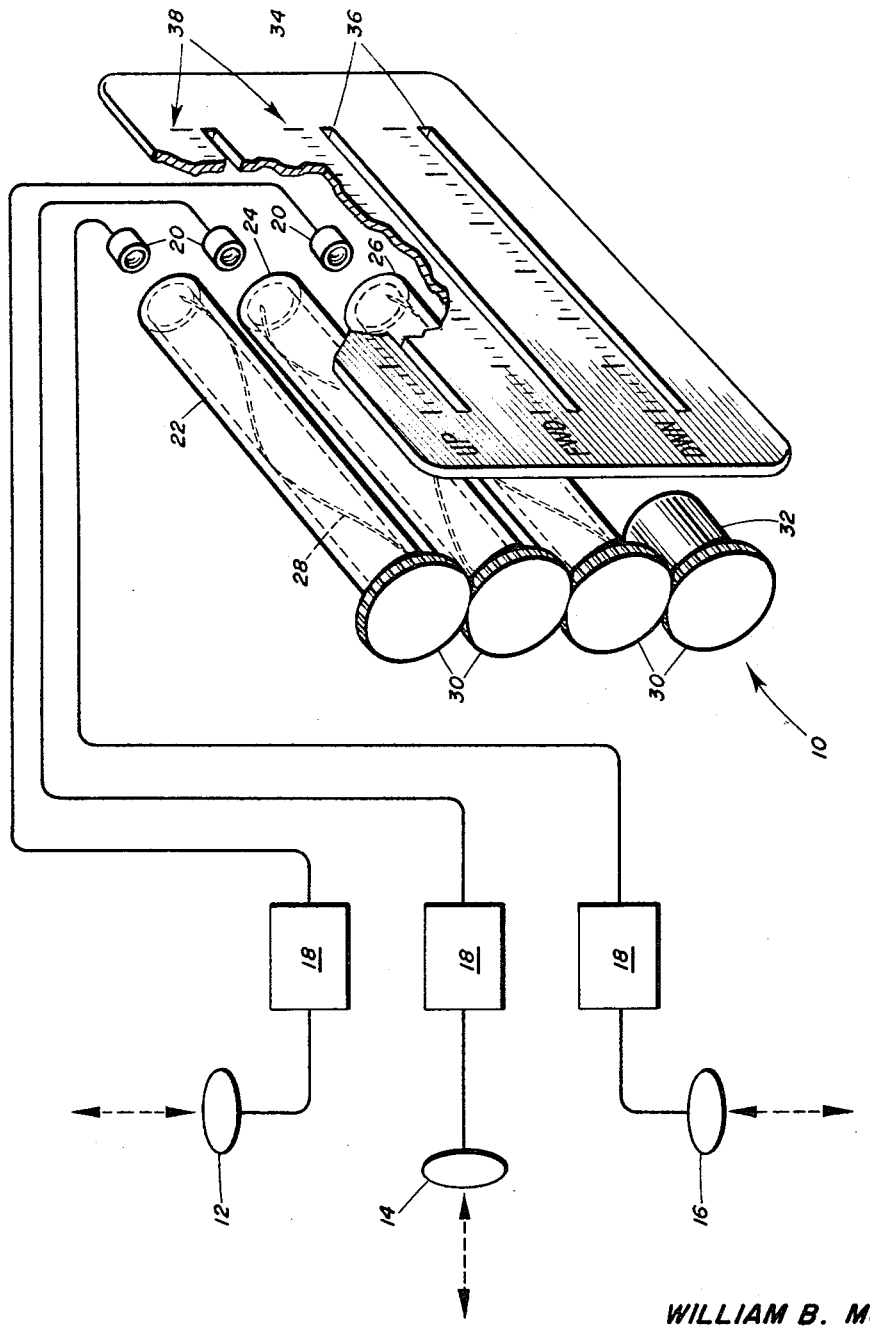

ABSTRACT OF THE DISCLOSURE

A plurality of electroacoustic transducers coupled with separate amplifier pulsers propagate a common sonar pulse in different directions and detect the echo pulse from each direction; a lamp is responsive to each said pulse to illuminate a rotating light conducting cylinder corresponding to each lamp, with each cylinder having a one-turn helical groove along its length for transmitting the illumination outwardly through a calibrated viewing slot in a display panel containing the viewing slot corresponding to each said cylinder.

---

This invention relates generally to echo systems, and more particularly it pertains to a novel display arrangement suitable for submarine navigation by sonar.

Revolving arm displays have long been used for displaying sonar signals. However, such display is not well suited for operation totally immersed in a fluid as is desirable for the new generation of submarines for super depth exploration.

It is an object of this invention to provide a relatively compact sonar echo display device having a minimum of moving parts so as to be suitable for total immersion in a fluid if desired.

Another object of this invention is to provide a display panel exhibiting side-by-side sonar signals representing several probing directions. To provide a sonic echo display unit having a linear scale, is yet another object of this invention.

Still another object of this invention is to provide a sonar system which searches in several directions and utilizes a common initiating pulse and composite viewing face plate.

Other objects and attendant advantages of this invention will become more readily apparent and understood from the accompanying specification and single somewhat schematic drawing.

Reference numeral 10 indicates generally a sonic echo system. This sonic echo system 10 indicates distances of use for submarines or other underwater vessels, namely upward, in a horizontal direction and downward. For this purpose three electroacoustic transducers 12, 14, 16 are respectively suitably oriented for propagation of a sonar pulse as indicated by the double ended dotted directional arrows.

Each of the electroacoustic transducers 12, 14, 16 is connected to an amplifier-pulser 18 and each of the latter connects to a gas discharge lamp 20 such as a neon bulb. These lamps 20 are mounted as to independently illuminate the ends of three parallel rotatable cylinders 22, 24 and 26 of polished Lucite.

Each cylinder 22, 24 and 26 has a one-turn helical groove 28 or abraded line on its inner or outer surface whereby the internal reflecting properties of the polished surface are spoiled and thus light from the lamp 20 can there emerge. The cylinders 22, 24 and 26 are geared together by one-to-one ratio gears 30 and arranged to be driven by a motor 32.

A face plate 34 having three viewing slots 36 is mounted in front of the cylinders 22, so as to give a view of only a short segment of each helix groove 28. Suitable scales 38 are marked alongside each slot 36 to represent the one-way distance traveled by a sonar pulse.

The gears 30 are meshed together so the helix grooves 28 of all three of the cylinders 22, 24, 26 simultaneously cross viewing slots 36 at one end (the zero origin distance).

At this time, the "main bang" pulse is sent out by all three electroacoustic transducers 12, 14 and 16. The received echoes will be received by these same electroacoustic transducers 12, 14, and 16 but likely at different times depending on the distance traveled.

Accordingly, the discharge lamps 20 will flash to illuminate the ends of the cylinders 22, 24, and 26, and the light will be visible through the slot 36 only where the visible segment of the helix groove 28 happens to be at the time along the scale 38. Since the scales 38 are marked in one-way distance corresponding to the transmission time of a sonar signal, the sonic echo system 10 will indicate directly and simultaneously the distances to the surface, to an object, or objects in a horizontal direction, and to the bottom.

Obviously many modifications and variations of the present invention are possible in light of the above teachings. It is, therefore, to be understood that within the scope of the appended claims the invention may be practiced otherwise than as specifically described.

What is claimed is:
1. A sonic echo display system, comprising, a plurality of electroacoustic transducers suitably oriented for propagation of sonar pulses in predetermined directions, means including an amplifier-pulser coupled to each electroacoustic transducer, means including a plurality of gas discharge lamps, each electrically coupled to a respective amplifier-pulser, a polished parallel rotatable Lucite cylinder for each siad gas-discharge lamp, each said cylinder having its respective gas discharge lamp positioned at one end thereof to receive the light signal therefrom, each said cylinder having a one-turn helix groove formed along its surface and running lengthwise thereof, whereby the internal reflecting properties of the polished surfaces of said cylinders are spoiled and thus light received from its respective gas discharge tube can there emerge, means for gearing said cylinders together, motor means for driving said gearing means, means including a display panel having parallel viewing slots corresponding to the number of said cylinders, each said viewing slot being positioned in the front of each cylinder to give a view of only a short segment of its respective helix groove, and means including a scale marked along its respective slot to represent the one-way distance traveled by the sonar pulses in their respective direction.

2. A sonic echo display system, comprising, a plurality of electroacoustic transducer means suitably oriented for propagation of sonar pulses in predetermined directions, means including an amplifier-pulser coupled to each electroacoustic transducer means, a plurality of light flashing means, each electrically coupled to a respective amplifier-pulser, a light conducting rotatable cylinder for each light flashing means, each said cylinder having its respective light flashing means positioned at one end thereof to receive the light signal therefrom, each said cylinder having helical light modifying means running lengthwise thereof, means for coupling said cylinders together for rotation thereof, means for driving said coupling means, means including a display panel having viewing slots corresponding to the number of said cylinders, each said viewing slot being positioned in the front of each cylinder to give a view of a short segment of its respective helical light modifying means, and means including a scale marked along its respective slot to represent the one-way distance traveled by the sonar pulses in their respective direction.

References Cited

UNITED STATES PATENTS

| | | | |
|---|---|---|---|
| 2,394,287 | 2/1946 | Bludworth | 58—39.5 |
| 2,678,621 | 5/1954 | Proctor | 116—124.4 X |
| 2,769,160 | 10/1956 | Fryklund | 340—3 |
| 3,122,719 | 2/1964 | Grieg | 340—3 X |

FOREIGN PATENTS 975,476  12/1961  Germany.

RICHARD A. FARLEY, *Primary Examiner.*